Sept. 14, 1954     O. K. SCHWENZFEIER     2,688,795
ADJUSTABLE KNOCK-OUT TOOL
Filed Nov. 6, 1952
Fig. 1
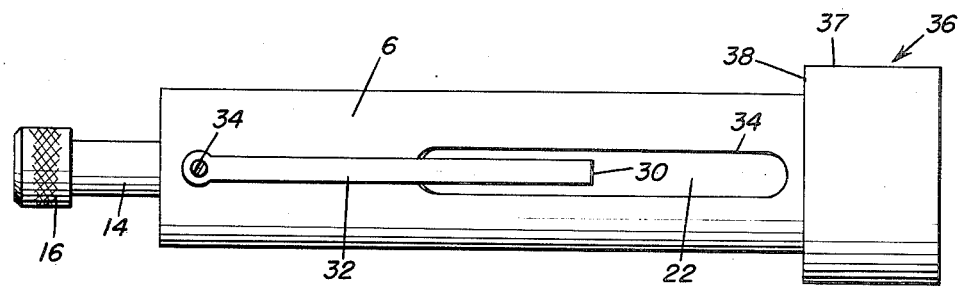
Fig. 2
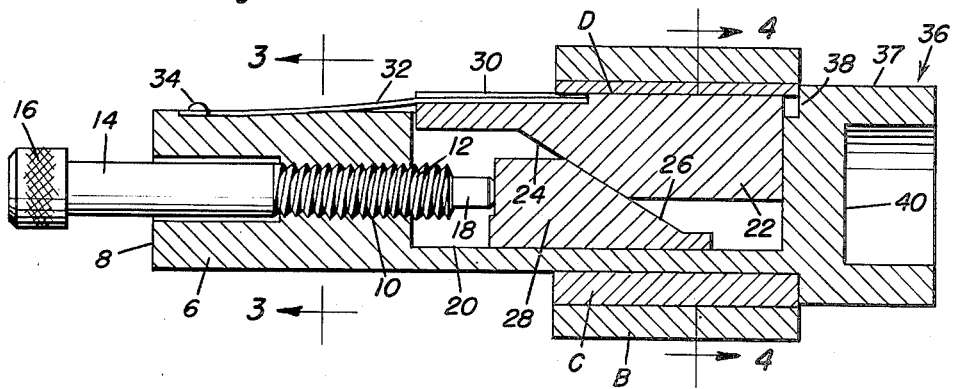
Fig. 4
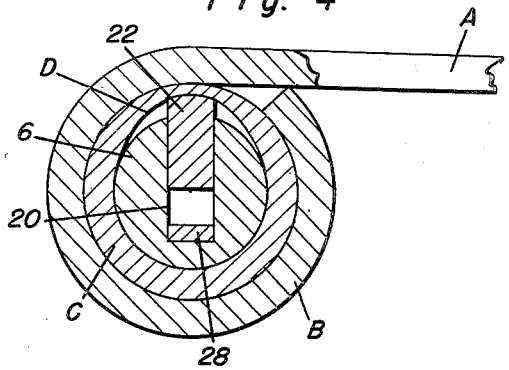
Fig. 3
Otto K. Schwenzfeier
INVENTOR.
BY Clarence A. O'Brien
and Harvey B. Jacobson
Attorneys Patented Sept. 14, 1954

2,688,795

UNITED STATES PATENT OFFICE 2,688,795

ADJUSTABLE KNOCK-OUT TOOL

Otto K. Schwenzfeier, McCook, Nebr.

Application November 6, 1952, Serial No. 319,071

1 Claim. (Cl. 29—275)

The present invention relates to a hand tool which is expressly, but not necessarily, designed and therefore well adapted for use by an automobile mechanic and whose use makes it possible for a mechanic to more readily and reliably dislodge and knock-out a bushing from its place of anchorage, particularly if the bushing is eccentrically worn and therefore out-of-round.

It is generally well known that difficulty is often encountered in attempting to dislodge and remove a metal bushing from a coiled eye on one end of a vehicle leaf spring. This is an even greater difficulty when, as is ordinarily the case, the bushing is out-of-round because it has worn unevenly, usually on one side, as a result of its repeated rubbing contact with a cooperating spring shackle. Knock-out tools which are now available are incapable of varying the diameter of the shank portion of the tool and therefore when the leading end of the shank is piloted into the opening in the worn bushing it takes a canted and off-center position and therefore the usual end-thrust head which is depended upon in banging the bushing loose and forcing it out fails to cooperate properly with the circular opening means in the eye in which the bushing is normally and quite firmly lodged. That is to say, the abutment surface or shoulder on the knock-out or endthrust head at the trailing end of the shank becomes misaligned with the opening means in the eye and trouble results especially when the operation has to be carried on in a place which is fairly inaccessible and hard to get to.

The instant invention has to do with a cylindrical or equivalent shank with a thrust head at the trailing end and which has means to compensate for the worn portions of the bushing so as to make it possible to fill the space between the periphery of the shank and the worn inner opening means of the bushing so that the shank is axially centered to bring the endthrust head into proper driving relation in respect to the bushing.

Briefly summarized, the invention appertains to a hand tool which is specifically designed to enable a mechanic to dislodge and knock a worn and out-of-round bushing from a circular hole in which it is tight-fitted, comprising a rigid shank of a maximum outside diameter capable of being dilated and passed through the center of opening in said bushing, said shank having an enlarged endthrust head at its trailing end of a diameter to just clear through said opening while, at the same time, having direct knock-out contact with the bushing, and radially expansible and contractible means carried by said shank and projectible to a selected position beyond the peripheral surface of said shank within the limits of the eccentrically worn portion of the bushing, whereby to axially center the endthrust head and to insure proper mating of the same with said bushing.

More specifically, novelty is predicated on a shank the leading end of which has an axial screw-threaded bore to accommodate an adjusting screw, the opposite or trailing end having the abutment endthrust head and the intermediate portion having recess means to accommodate the radially projectible and retractible diameter adjusting and tool centering block.

Another object of the invention is to provide a tool of a simple and economical type which has the facilities above mentioned and which has been found to constitute a satisfactory and reliable means for saving time due to the fact that it is not necessary to try to use one hand to center it in the old way and to attempt to hit the head with a hammer or the like held in the other hand. In fact, when the improved tool is brought into play and adjusted to fit the varying types of bushings it stays put and therefore leaves both hands free to operate and to be able to do the required job with a minimum of effort and time involved.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevational view of an automobile mechanic's hand-type knock-out tool constructed in accordance with the principles of the present invention;

Figure 2 is a central longitudinal sectional view with a portion appearing in elevation;

Figure 3 is a cross-section on the line 3—3 of Figure 2 looking in the direction of the arrows; and, Figure 4 is a cross-section on the line 4—4 of Figure 2 looking in the direction of the arrows.

Referring now to the drawings by way of reference numerals and accompanying lead lines, a one-piece shank and head forming the tool proper embodies a cylindrical shank 6 the leading end of which is denoted at 8. This end portion has an axial bore therein a portion of which is internally screw-threaded at 10. This is to accommodate the screw-threaded portion 12 of the adjustable setscrew 14. The outer end of this has an appropriate and suitably knurled finger-grip or knob 16. The inner reduced end portion 18 of the setscrew projects into a recess or pocket 20 which registers with the bore and opens thru what may be called the top peripheral surface of the shank. This pocket serves to accommodate a radially expansible and contractible centering block 22 having a cam surface 24 to accommodate the cam surface 26 on the adjusting slide 28 which is confined in the pocket. The outer marginal edge portion of the adjusting and centering block has a groove 30 therein to receive an end portion of a flat spring 32 which is anchored at the left-hand end as at 34 on the piloting or leading end of the shank. The spring tends to press the projectible and retractible block 22 into the recess or pocket means 20. Obviously the setscrew serves to press the slide 28 in a direction from left to right in Figure 2 to bring about coaction between the inclined planes 24 and 26 resulting in forcing the adjusting block 22 out through the portion which may be called the slot 34 in an obvious manner. The trailing or right-hand end of the shank has a head 36 formed integrally therewith and the head is preferably circular in cross-section and one side is provided wtih an outstanding abutment or shoulder 38 while the other side is recessed to provide a socket 40 to accommodate a driving tool (not shown) which is sometimes used in applying a blow from a hammer or mallet to the bushing dislodging and knock-out shank.

In Figure 4 the letter A designates a vehicle leaf spring having one end coiled to define what may be conveniently referred to as an eye B into which a rubber or equivalent bushing C is lodged. As stated, it is frequently the case that the inside opening means in the bushing will get off center or out-of-round as denoted at D in Figure 4 and in order to accomplish satisfactory results this requires the use of an adjustable knock-out tool such as herein shown and described. All tools that are known to me are not adjustable and consequently when the bushing is worn on one side the tools that are now on the market slip to the worn portion and the drive-out or thrust shoulder at the head end does not line up with the opening means in the eye B. The instant tool however, takes care of this disparity and hence the expansible and contractible adjusting and space filling block 22 compensates for the out-of-round difficulties met in the showing in Figure 4.

It is not necessary to "juggle" the leading or piloting end in the instant tool shank because once said end enters the opening means in the bushing and the adjusting block is set by way of adjusting the setscrew, the shank takes the satisfactorily piloted or axially centered position seen in Figure 4 where it makes it possible to bring the shoulder means 38 into proper endthrust and driving contact with the meeting and mating face of the bushing, all as satisfactorily brought out in Figure 2.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A hand tool which is specifically designed to enable an automobile mechanic to dislodge and knock out a worn out-of-round bushing from a truly circular hole in a leaf spring eye in which said bushing is fitted comprising an elongated rigid shank cylindrical in cross-section and having a leading end and a trailing end and being of an outside diameter slightly smaller than the original internal diameter of said bushing and capable of permitting said shank to be piloted and passed freely through the center opening in the bushing which is to be dislodged and removed, said shank being provided at its trailing end with an integral axially aligned enlarged head, said head being of an outside diameter greater than the outside diameter of said shank but slightly less than the diameter of the hole in said eye so as to permit passage of said head through said hole and, in addition, to provide an endless endthrust shoulder at the juncture of the shank and head which is engageable with the bushing in a manner to permit the latter to be dislodged and forcibly driven out of said hole, the leading end of said shank having an axial screw-threaded bore, an adjustable setscrew having a portion threaded into said bore and having an adjusting head located in an accessible readily adjustable position beyond the leading end of the shank, said shank having recess means adjacent to said head and providing a pocket, said pocket being in registration with said bore and opening radially through a peripheral surface of the shank, a space filling, compensating and head centering block mounted for radial adjustment in said pocket and adapted to be aligned with and project into the out-of-round portion of said bushing, and an operating connection between said setscrew and centering block, said operating connection including a slide having an inclined surface and said block having an inclined surface contacting said first-named inclined surface.

References Cited in the file of this patent

UNITED STATES PATENTS

| Number | Name | Date |
| --- | --- | --- |
| 1,357,146 | Case | Oct. 26, 1920 |
| 2,174,451 | Strange | Sept. 26, 1939 |
| 2,353,774 | Wagner | July 18, 1944 |
| 2,620,012 | Walsh | Dec. 2, 1952 |